United States Patent
Makarov

(10) Patent No.: US 11,977,051 B2
(45) Date of Patent: May 7, 2024

(54) ION MOBILITY ANALYSER

(71) Applicant: Thermo Fisher Scientific (Bremen) GmbH, Bremen (DE)

(72) Inventor: Alexander Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 209 days.

(21) Appl. No.: 17/659,190

(22) Filed: Apr. 14, 2022

(65) Prior Publication Data

US 2022/0365027 A1 Nov. 17, 2022

(30) Foreign Application Priority Data

May 14, 2021 (GB) ..................................... 2106900

(51) Int. Cl.
*G01N 27/00* (2006.01)
*G01N 27/623* (2021.01)
*H01J 49/04* (2006.01)

(52) U.S. Cl.
CPC ........ *G01N 27/623* (2021.01); *H01J 49/0422* (2013.01)

(58) Field of Classification Search
CPC . G01N 27/623; G01N 27/622; H01J 49/0422; H01J 49/065
USPC ................................................ 250/281, 282
See application file for complete search history.

(56) References Cited

U.S. PATENT DOCUMENTS 8,975,578 B2 * 3/2015 Green .................. G01N 27/623
250/281
10,515,790 B2 12/2019 Cheng et al.
2019/0164737 A1 5/2019 Gillig et al.

FOREIGN PATENT DOCUMENTS

GB 2490410 A 10/2012

* cited by examiner

*Primary Examiner* — Michael Maskell
(74) *Attorney, Agent, or Firm* — William R McCarthy, III

(57) ABSTRACT

An ion mobility analyser comprising an ion guide is provided. The ion guide defines an ion drift channel extending in an axial direction an includes first and second electrode assemblies provided on opposing sides of the ion drift channel. Each of the first and second electrode assemblies extend in the axial direction and in a transverse direction which is transverse to the axial direction. The first and second electrode assemblies are spaced apart on opposing sides of the ion drift channel by a first distance at a narrowest point along the axial direction. Each of the first and second electrode assemblies comprises a set of first electrodes, and a set of second electrodes. The electrodes in the first and second sets are arranged in an alternating pattern in the transverse direction. The alternating pattern extends in the transverse direction a second distance that is greater than the first distance.

20 Claims, 6 Drawing Sheets

Cross-section D-D

Cross-section C-C

ION MOBILITY ANALYSER

CROSS-REFERENCE TO RELATED APPLICATIONS

The present application claims priority benefit under one or more of 35 U.S.C. 119(a)-119(d) of GB Patent Application No. 2106900.0 filed May 14, 2021, which is hereby incorporated by reference herein in its entirety for all purposes.

FIELD OF THE DISCLOSURE

The present disclosure relates to spectrometry. In particular, the present disclosure relates to ion mobility spectrometry and ion mobility spectrometers.

BACKGROUND

Ion mobility spectrometry is a method of separating ions according to their mobility. Typically, ions are separated according to their mobility as they travel through an ion drift channel containing a gas. Ion mobility separation is often coupled with other separation techniques, such as mass spectrometry (MS), in order to improve the signal-to-noise (S/N) and separation of ions.

Various types of ion mobility spectrometers (IMS) are known in the art including DC/RF drift tube devices, differential mobility analysers, trapped ion devices, and travelling wave type devices. Some IMS may employ a counterflow of gas (at least in part to extend the effective length of the drift tube). Some forms of IMS may be operated at low pressures suitable for use with other mass spectrometry instruments.

U.S. Pat. No. 7,838,826 discloses a trapped ion mobility spectrometer (TIMS) in which ions are trapped against a retarding electric field by a flow of gas through the ion mobility spectrometer. The drift channel of the TIMS comprises a plurality of ring electrodes which are cylindrically symmetric (e.g. see FIGS. 4A and 4B). As such, the electrodes of U.S. Pat. No. 7,838,826 have a rotational symmetry about a central axis of the drift channel.

US2017350860 (e.g. FIG. 5 shown below) discloses other configurations of RF multipole electrodes for a TIMS arranged about a central axis (e.g. square cross-section, hexagonal cross-section, octagonal cross-section, circular cross-section). The TIMS of US2017350860 have rotational symmetry about the direction of ion travel of at least order 4.

SUMMARY

According to a first aspect, an ion mobility analyser is provided. The ion mobility analyser comprises an ion guide. The ion guide defines an ion drift channel extending in an axial direction. The ion guide comprises first and second electrode assemblies provided on opposing sides of the ion drift channel. Each of the first and second electrode assemblies extend in the axial direction and in a transverse direction which is transverse to the axial direction. The first and second electrode assemblies are spaced apart on opposing sides of the ion drift channel by a first distance at a narrowest point along the axial direction. Each of the first and second electrode assemblies comprises a set of first electrodes, and a set of second electrodes. The electrodes in the first and second sets are arranged in an alternating pattern in the transverse direction. The alternating pattern extends in the transverse direction a second distance that is greater than the first distance.

The ion mobility analyser of the first aspect provides an ion drift channel which has a cross section which is elongated in the transverse direction (e.g. in the x-direction). That is to say, a cross section of the ion drift channel normal to the axial direction (e.g. in the z-direction, the direction of ion travel) extends a greater distance in the transverse direction (x-direction) than in the direction perpendicular to the transverse direction (e.g. y-direction) at a narrowest point of the ion guide. In some embodiments, the drift channel may extend in the transverse direction (x-direction) at least 2x, 3x, 4x, 5x, 10x, 15x or 20x greater than in the direction perpendicular to the transverse direction (y-direction). As such, ions that travel along the ion drift channel may be distributed throughout the elongated ion drift channel (i.e. distributed along the transverse direction). Effectively, the ion drift channel extends in the transverse direction in a planar (or quasi planar) manner. By contrast, the TIMS known in the art comprising a plurality of ring electrodes have ion draft channels which are focused in a symmetrical manner about a central axis. By extending the cross-sectional area of the ion drift channel in the transverse direction (for a given electrode assembly spacing), space charge effects associated with the ion drift channel are reduced. As ions are focused to a generally planar ion drift channel, rather than an axial drift channel as is known in the art, the space charge effects associated with increasing ion numbers in the ion drift channel are reduced.

Accordingly, the space charge capacity of the ion drift channel may be increased in some embodiments by orders of magnitude without sacrificing performance.

By providing an ion drift channel which is less susceptible to the effects of space charge relative to those known in the art, the ion mobility analyser of the first aspect can accommodate higher ion currents within the drift channel without being affected by space charge effects. Accordingly, ion mobility analysers according to the first aspect of the invention may be provided with improved sensitivity.

In some embodiments, in each cross-section of the ion guide normal to the axial direction, the first and second electrode assemblies are uniformly spaced apart along the transverse direction. That is to say, the spacing between the first and second electrode assemblies is uniform in any cross-section of the ion guide. It will be appreciated that the spacing between the ion guides may vary in the axial direction, wherein the minimum spacing at the narrowest point is the first distance (i.e. a funnel shaped ion guide). In other embodiments, in each cross-section of the ion guide normal to the axial direction, the first and second electrode assemblies may have a variable spacing along the transverse direction. For example, in some embodiments the first and second electrode assemblies may be provided as opposing concave assemblies in each cross-section of the ion guide. As such, a spacing between the first and second electrode assemblies increases from the outer regions of the ion drift channel towards a central region of the ion drift channel in the transverse direction. As such, the first and second electrodes of each of the first and second electrode assemblies may be arranged in the transverse direction along an elliptical or otherwise curved path. The elliptical or curved arrangement of the electrodes is nevertheless configured to provide a substantially uniform distribution of ions in the transverse direction of the ion drift channel.

In some embodiments, the distance the first and second electrode assemblies are spaced apart changes from an entrance end of the ion guide towards an exit end of the ion guide. For example, the first and second electrode assemblies may be angled with respect to each other in the axial direction to provide spacing which varies in the axial direction. As such, ions in the ion guide may be focused to an ion drift channel which, at least at the narrowest point, is generally elongated in the transverse direction. In some embodiments, the distance the first and second electrode assemblies are spaced apart may increase from an entrance end of the ion guide towards an exit end of the ion guide, while in other embodiments, the distance the first and second electrode assemblies are spaced apart may decrease from an entrance end of the ion guide towards an exit end of the ion guide.

In some embodiments, the first and second electrode assemblies are spaced apart a uniform distance in the axial direction and in the transverse direction. As such, the first and second electrode assemblies may extend in the axial direction generally parallel to each other. It will be appreciated that in some embodiments, an ion drift channel may be provided which combines sections of angled electrode assemblies and sections of parallel electrode assemblies.

In some embodiments, the ion mobility analyser further comprises an RF power supply configured to supply an RF voltage to the first electrodes and an opposing RF voltage (i.e. opposite polarity having a phase shift of 180°) to the second electrodes of each of the first and second electrode assemblies. By supplying RF voltages of alternating potentials to adjacent first and second electrodes along the transverse direction of each of the first and second electrode assemblies, the ion guide provides a pseudopotential electrical field which focuses ions to a planar (or quasi-planar) ion drift channel in the region between the opposing first and second electrode assemblies.

In some embodiments, the ion mobility analyser may comprise a DC power supply. The DC power supply may be configured to supply a DC bias voltage to each of the first and second electrodes. In some embodiments, the power supply which provides the RF voltages may also provide the DC bias voltages. The power supply may be configured to supply different DC bias voltages to at least some of the first and second electrodes along the axial direction of the ion guide. For example, the DC power supply may be configured to provide a DC potential barrier along the axial direction of the ion guide for the purposes of performing TIMS. The DC power supply may also be configured to provide a DC potential gradient along the axial direction of the ion guide in order to guide ions along the length of the ion guide.

In some embodiments, the ion mobility analyser further comprises a source of gas flow, wherein the source of gas flow configured to direct a laminar gas flow through the ion guide. By providing a source of gas flow along the axial direction of the ion drift channel, the ion mobility analyser can be configured to implement a TIMS configuration, or to effectively extend the length of the ion drift channel.

In some embodiments, a gas flow rate of the source of gas flow is provided such that a boundary layer of the laminar gas flow extending from each of the first and second electrode assemblies is spaced apart from the ion drift channel. It will be appreciated that the boundary layer of the laminar gas flow may extend from each of the first and second electrode assemblies towards a central region of the ion guide. The thickness of the boundary layer will depend, at least in part, on the velocity of the gas travelling through the ion guide, which may be determined by the gas flow rate of the source of gas flow. The gas flow rate may be provided such that the boundary layer does not extend into the region of the ion drift channel where the ions are confined by the pseudopotential RF electrical field. By providing such separation between the boundary layer and the confined ions, the ions travelling in the IMS may experience a generally laminar, uniform, gas flow across the planar ion drift channel.

In some embodiments, a thickness of the boundary layer extending from each of the first and second electrode assemblies in the direction normal to each of the first and second lines is no greater than 30% of the spacing between the first and second electrode assemblies. As such, the ion guide provides a central region of at least 40% of the spacing between the first and second electrode assemblies in which the ion drift channel may be provided. By providing a central region of such a thickness, ions may be confined in a region of generally laminar flow, and not in a boundary layer flow region.

In some embodiments, a source of gas flow is provided in addition to any gas flow from the ion source. It will be appreciated that some ion sources that are used to inject ions into IMS inherently provide some gas flow when injecting ions. In this disclosure, the source of gas flow provided may be additional to the inherent gas flow provided by an ion source. In particular, in some embodiments, the source of gas flow may be configured to provide a gas flow which is at least double the gas flow rate of any inherent gas flow from the ion source. That is to say, the total gas flow travelling through the ion mobility spectrometer is substantially provided by the source of gas flow, rather than as a result of any gas flow from an ion source.

In some embodiments, the source of gas flow comprises a recirculating pump configured to recirculate gas flow through the ion guide. It will be appreciated that IMS according to this disclosure may be provided under vacuum conditions (e.g. at pressures below about 0.1 MPa). For example in some embodiments, the IMS may be operated at pressure of around 100-1000 Pa. To provide the desired gas flow rates, the source of gas flow may be configured to recirculate gas flow through the ion guide. A recirculating pump may be provided to draw gas flow through the ion guide and direct gas back towards to entrance to the ion guide. The recirculating pump and the ion guide may be provided within a closed vacuum system in order to provide the desired gas flow at the desired operating pressure.

In some embodiments, the source of gas flow is configured to direct a laminar gas flow through the ion guide having a Mach number of at least 0.05, or at least 0.1, or at least 0.2, or at least 0.3. As such, the source of gas flow may be configured to direct gas through the ion guide such that a velocity of the gas within the ion guide has a desired Mach number. By providing gas flow with the desired Mach number, the gas flow in the ion drift channel where the ions travel may be suitably uniform. In particular, the gas flow may maintain its uniformity across the cross section of the ion drift channel in the transverse direction.

In some embodiments, the first and second electrode assemblies each include a set of first electrodes and a set of second electrodes which are arranged in an alternating pattern. The alternating pattern of first and second electrodes may be repeated along the axial direction of each of the first and second electrode assemblies. Each first electrode may be offset from adjacent second electrodes in the transverse direction (i.e. x-direction). Each first electrode may also be offset from adjacent second electrodes in the axial direction (i.e. z-direction). For example in one possible repeating pattern, each of the first electrodes may be spaced apart from adjacent second electrodes in the transverse direction by a first pitch (H), and spaced apart from adjacent second electrodes in the axial direction by a second pitch (h). The repeating pattern of first and second electrodes may be repeated along the axial direction of the first and second electrode assemblies. In some embodiments, the second pitch (h) may be smaller than the first pitch (H). As such, a plurality of alternating first and second electrodes may be provided along the transverse direction of the electrode assemblies. The first and second electrodes may be supplied with opposing RF phases in order to provide a pseudopotential RF field which is aligned with a generally planar surface which is extends along the axial and transverse directions of the ion guide.

There are various possibilities for arranging the first and second electrodes of each of the first and second electrode assemblies. In some embodiments, each of the first and second electrode assemblies extend in the transverse direction along straight lines. That is to say, each of the first and second electrode assemblies may comprise a plurality of first and second electrodes which extend along a plane aligned with the transverse and axial directions.

Accordingly, the resulting ion drift channel formed between the first and second electrode assemblies has a generally planar symmetry.

In some embodiments, the first and second electrode assemblies extend in the transverse direction along concentric circles, or along concentric arcs. In such an arrangement, the spacing provided between the first and second electrode assemblies may still be considered uniform in the radial direction of the concentric circles/arcs. By forming the first and second electrode assemblies concentrically, the ion drift channel extends along a circle or arc. In such an arrangement, the ion drift channel may be considered to have a quasi-planar cross section, as the ion drift channel is effectively elongated along a transverse direction, wherein the transverse direction follows a circle/arc. As such, the ion drift channel formed still provides a region for confining ions which is effectively extends further in the transverse direction than it is does in the radial direction.

In some embodiments, each of the first and second electrode assemblies may comprise a printed circuit board having the first and second sets of electrodes printed thereon. In some embodiments, for example where the ion drift channel is quasi-planar, the printed circuit board may be a flexible printed circuit board.

In some embodiments, the IMS further comprises an ion funnel located at an entrance end to the ion guide, the ion funnel configured to funnel ions towards the entrance end of the ion guide. In some embodiments, the ion funnel may be provided between a source of ions and the entrance end of the ion guide such that it collects ions output from the ion source. The ion funnel may have a central axis which is aligned with the axial direction of the ion guide. The ion funnel may be provided in order to assist with the focusing of ions into the generally planar ion drift channel. The ion funnel may also assist with channelling the gas flow into the ion drift channel in order to provide the desired gas flow velocity in the ion guide. In some embodiments, the IMS further comprises an ion funnel located at an exit end to the ion guide, the ion funnel at the exit end configured to funnel ions away from the exit end of the ion guide. In some embodiments, the ion funnel at the exit end may be provided between the exit end of the ion guide and an ion detector, wherein the detector may be part of a mass spectrometer such that the funnel collects ions from the ion guide and funnels them into the mass spectrometer.

In some embodiments, the first and second electrode assemblies are configured to receive a DC bias voltage at a point along the axial direction of the ion guide in order to create potential barrier to trap ions travelling along the ion drift channel. As such, the first and second electrode assemblies may be configured to provide a potential barrier at a point along the ion drift channel which impedes the flow of ions along the ion drift channel. Such a potential barrier may be used to perform a method of trapped ion mobility spectrometry. In some embodiments, the DC bias voltage may be applied to at least some of the first and second electrodes of the first and second electrode assemblies at a point along the ion guide. Alternatively, additional DC electrodes may be provided at a point along the ion guide to provide the potential barrier.

In particular, the ion mobility analyser according to the first aspect of the disclosure may be used as a trapped ion mobility spectrometer (TIMS). As such, according to a second aspect of the disclosure, a TIMS is provided. The TIMS comprises an ion guide in accordance with the first aspect of the disclosure. As such, the ion guide of the TIMS defines an ion drift channel extending in an axial direction. The ion guide comprises first and second electrode assemblies spaced apart provided on opposing sides of the ion drift channel. Each of the first and second electrode assemblies extends in the axial direction and in a transverse direction which is transverse to the axial direction. The first and second electrode assemblies are uniformly spaced apart on opposing sides of the ion drift channel by a first distance. Each of the first and second electrode assemblies comprises a plurality of first electrodes and a plurality of second electrodes. The first and second electrodes of each electrode assembly are arranged in an alternating pattern in the transverse direction. The alternating pattern extends in the transverse direction a second distance that is greater than the first distance. Furthermore, the TIMS comprises an RF power supply configured to supply an RF voltage to the first electrodes and an opposing RF voltage to the second electrodes of each of the first and second electrode assemblies. The TIMS may also include a source of gas flow, the source of gas flow configured to direct a laminar gas flow through the ion guide. The TIMS may also comprise a DC voltage source configured to apply a DC potential barrier to at least some of the first and second electrodes of the first and second electrode assemblies in order to trap ions within the ion drift channel.

According to a third aspect of the disclosure, a method of ion mobility analysis is provided. The method comprises injecting ions into an ion mobility analyser according to the first aspect of the disclosure, or the TIMS of the second aspect, and separating at least some of the ions based on a time of elution from the ion drift channel or a time taken to transit the ion drift channel. The method may comprise determining a mobility of at least some of the ions based on a time taken to transit or elute from the ion drift channel. It will be appreciated that for some methods of ion mobility analysis, ions may be separated based on a transit time through the ion drift channel. In some methods of ion mobility analysis where ions are trapped within the ion drift channel, ions may be separated according to a time to elute from the ion drift channel.

According to a fourth aspect of the disclosure an ion mobility analyser-mass spectrometer is provided. The ion mobility analyser-mass spectrometer comprises an ion mobility analyser according to the first aspect of the disclosure and a mass spectrometer for receiving ions from the ion mobility analyser. In operation, the ions are first separated according to their mobility by the ion mobility analyser and are then introduced into the mass spectrometer where their mass to charge ratios (m/z) can be determined.

BRIEF DESCRIPTION OF THE FIGURES

Embodiments of the present disclosure will now be described, by way of example only, with reference to the accompanying figures in which.

DESCRIPTION

Figure 1:
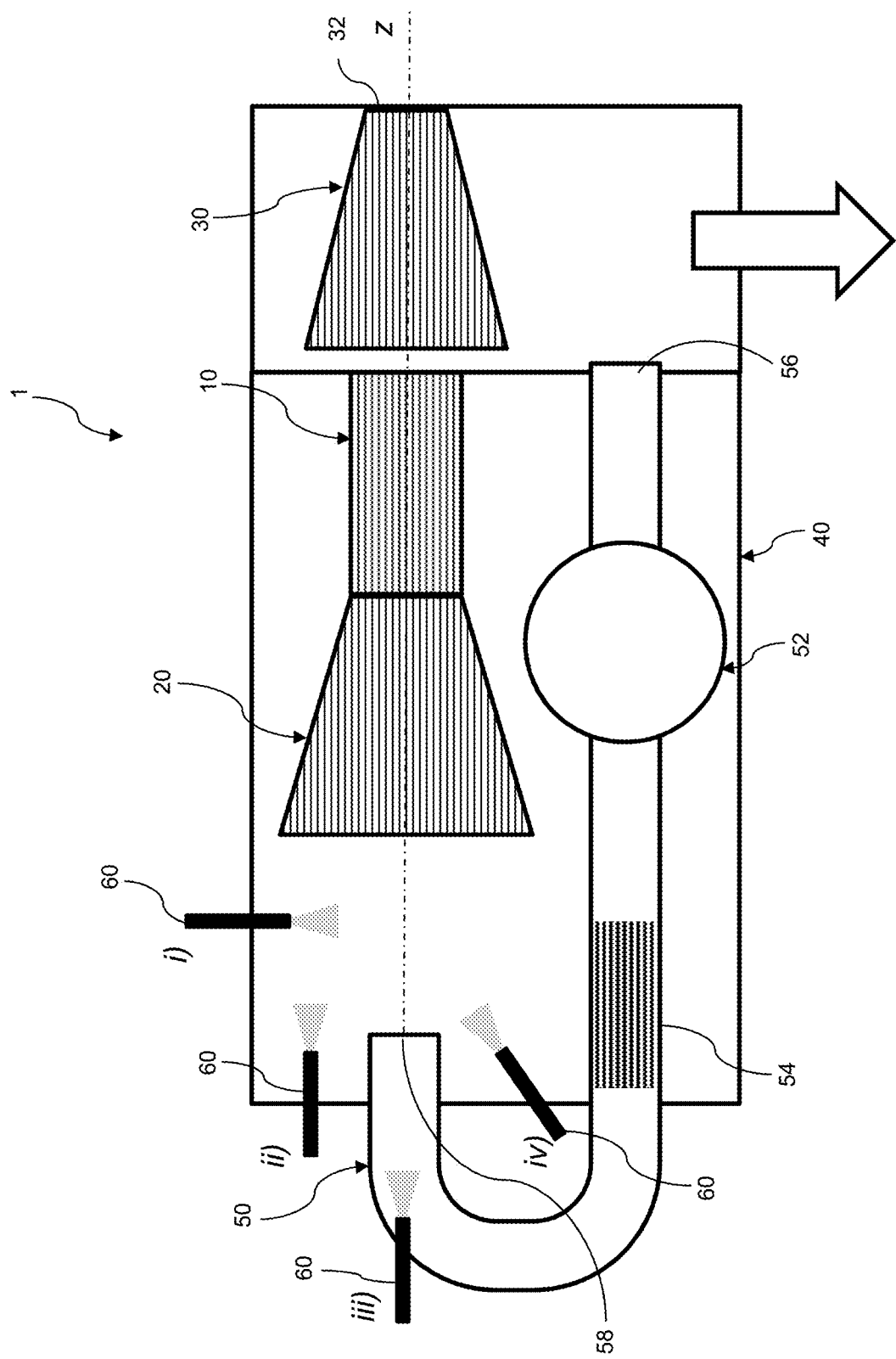
FIG. 1 shows a schematic diagram of an ion mobility analyser comprising a source of gas flow according to an embodiment of the disclosure.

FIG. 1 shows a schematic diagram of an ion mobility analysis system 1 according to a first embodiment of the disclosure. The ion mobility analysis system 1 comprises an ion mobility analyser 10, and entrance funnel 20 and an exit funnel 30. As shown in FIG. 1, the ion mobility analyser 10 may be arranged between the entrance funnel 20 and the exit funnel 30.

Figure 2:
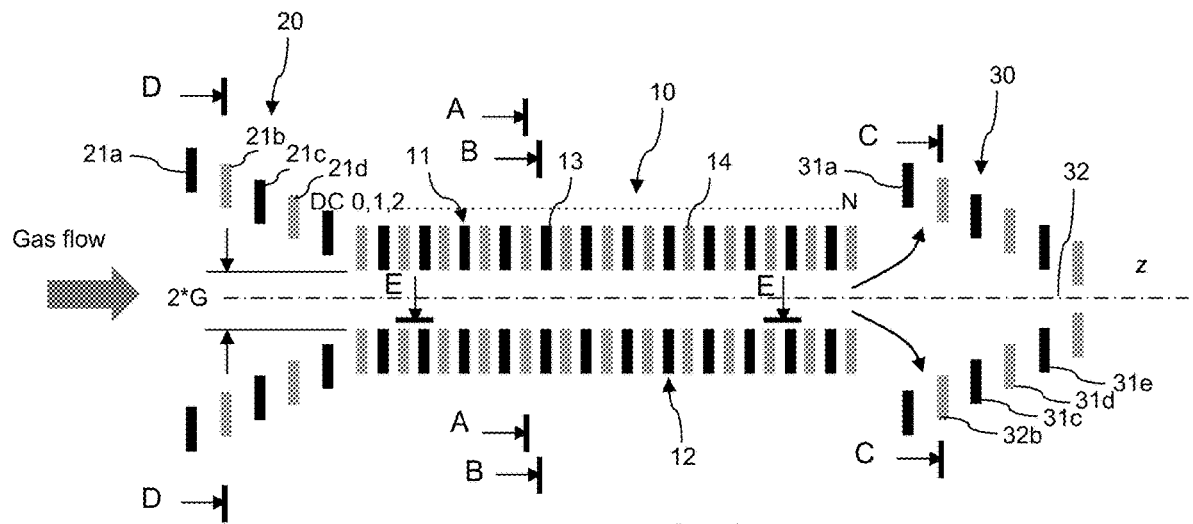
FIG. 2 shows a schematic diagram of a cross section of an ion mobility analyser parallel to the axial direction of the ion mobility analyser according to an embodiment of the disclosure.

FIG. 2 shows a schematic diagram of a cross-section of the ion mobility analyser 10, the entrance funnel 20 and the exit funnel 30. The ion mobility analyser 10, entrance funnel 20 and exit funnel 30 shown in FIG. 2 may be provided as part of the ion mobility analysis system 1 shown in FIG. 1. As shown in FIG. 2, a central axis of the entrance funnel 20, a central axis of the ion mobility analyser 10, and a central axis of the exit funnel 30 are aligned (i.e. they are co-axial) in an axial direction (z-direction). As such, ions may travel in the axial direction from the entrance funnel 20 through the ion mobility analyser 10 and into the exit funnel 30.

The ion mobility analyser 10 comprises a first electrode assembly 11 and a second electrode assembly 12. The first and second electrode assemblies 11, 12 are arranged along the axial direction spaced apart from each other in order to define an ion drift channel between the first and second electrode assemblies 11, 12. Each of the first and second electrode assemblies extends in the axial direction and also in a direction which is transverse to the axial direction (x-direction). As shown in FIG. 2, the first and second electrode assemblies are spaced apart from each other in a direction orthogonal to the transverse direction (y-direction). In the embodiment of FIG. 2, the first and second electrode assemblies are spaced apart such that the first and second electrode assemblies 11, 12 extend along parallel planes. The first and second electrode assemblies 11, 12, are spaced apart by a first distance at a narrowest point along the axial direction. In the embodiment of FIG. 2, the first and second electrode assemblies are spaced apart a uniform distance along the axial direction (i.e. a uniform spacing). As such, the narrowest point of spacing between the first and second electrode assemblies 11, 12 occurs at each point along the length of the ion mobility analyser 10. Of course, in other embodiments the first and second electrode assemblies 11, 12 may be provided at an angle relative to each other, such that the narrowest point occurs at a point along the ion mobility channel.

Figure 3:
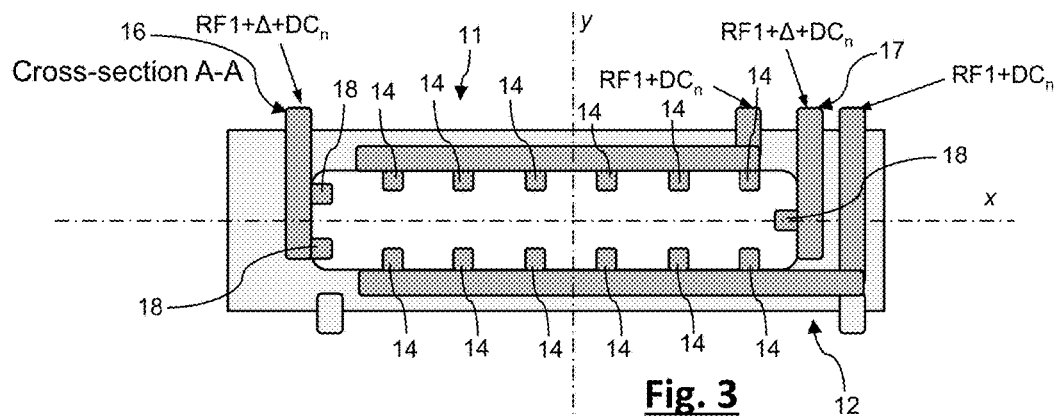
FIG. 3 shows a schematic diagram of a cross section of an ion mobility analyser transverse to the axial direction at a first point along the ion mobility analyser of FIG. 2.

The first electrode assembly 11 comprises a set of first electrodes 13 and a set of second electrodes 14. The first electrodes 13 and the second electrodes 14 are arranged in an alternating pattern in the transverse direction (x-direction) as well as in the axial direction (z-direction). FIG. 3 shows a cross-section of the ion mobility analyser 10 through a plane A-A indicated in FIG. 2. As shown in FIG. 3, a plurality of second electrodes 14 are connected together as part of the first electrode assembly 11. The plurality of second electrodes 14 are arranged along the transverse direction (x-direction) spaced apart from each other. In the cross-section of FIG. 3, six electrodes 14 are provided extending in the transverse direction. The plurality of second electrodes 14 are connected together and connected to a supply of RF and DC power. In other embodiments, the number of second electrodes 14 provided in the transverse direction of the first electrode assembly 11 may be at least 2, at least 4, at least 6 or at least 8.

Similar to the first electrode assembly 11, the second electrode assembly 12 comprises a set of first electrodes 13 and a set of second electrodes 14. As shown in FIG. 3, the second electrode assembly 12 is provided with a similar arrangement of second electrodes 14 to the first electrode assembly 11 on an opposite side of the ion drift channel. The second electrodes 14 of the second electrode assembly 12 are also connected to a supply of RF and DC power. In some embodiments, such as shown in FIG. 3, the second electrode assembly 12 may mirror the arrangement of electrodes provided for the first electrode assembly 11 on the opposing side of the ion drift channel. In other embodiments, the arrangement of electrodes for the second electrode assembly 12 may be the same as the first electrode assembly 11 but offset from the first electrode assembly 11. The offset may be provided in the axial direction and/or in the transverse direction.

Figure 4:
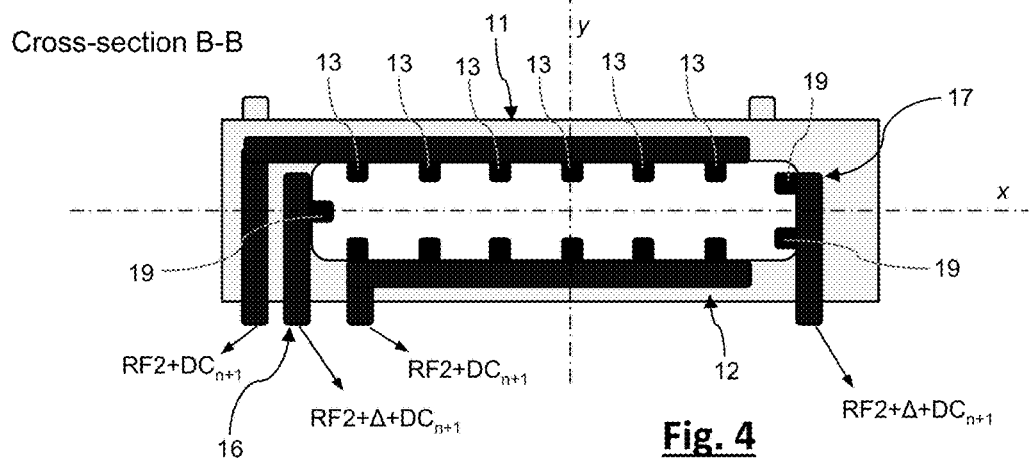
FIG. 4 shows a schematic diagram of a cross section of an ion mobility analyser transverse to the axial direction at a second point along the ion mobility analyser of FIG. 2.

FIG. 4 shows a second cross-section through a plane B-B indicated in FIG. 2. As shown in FIG. 4, the first electrode assembly 11 also comprises a plurality of first electrodes 13 which are arranged along the transverse direction (x-direction). The first electrodes 13 are arranged along the transverse direction and connected together to a supply of RF and DC power. Similar to the cross-section of FIG. 3, the first electrodes are spaced apart from each other. In the cross-section of FIG. 4, six first electrodes 13 are connected together and connected to a supply of RF and DC power. In other embodiments, the number of first electrodes 13 provided in the transverse direction of the first electrode assembly 11 may be at least 2, at least 4, at least 6 or at least 8.

Similarly, the second electrode assembly 12 shown in FIG. 4 also comprises a plurality of first electrodes 13 which extend in the transverse direction and are connected together to a supply of RF and DC power.

As shown in FIGS. 3 and 4, each of the first and second electrodes 13, 14 may be provided as a similar sized electrode for the first and second electrode assemblies 11, 12. Each electrode may be formed from a region of a printed circuit board, or as a metallic electrode (e.g. in the form of a plate).

By comparison of FIGS. 3 and 4, it will be appreciated that the first and second electrodes 13, 14 of each of the first and second electrode assemblies 11, 12 are arranged such that they alternate along the transverse direction. As such, although each of the first and second electrodes 13,14 are axially offset from each other it will be appreciated form the common y axis in FIGS. 3 and 4 that the first and second electrodes 13, 14 are interleaved to provide an alternating pattern of electrodes in the transverse direction.

Figure 5:
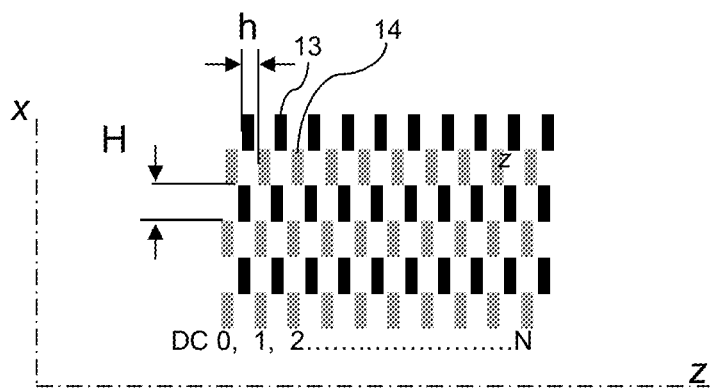
FIG. 5 shows a schematic diagram of a first arrangement of first and second electrodes for an electrode assembly.

FIG. 5 is a schematic diagram looking in the direction of view E-E indicated in FIG. 2. FIG. 5 shows an arrangement of first and second electrodes 13, 14 in the x-z plane for one of the first and second electrode assemblies 11, 12. FIG. 5 shows the alternating pattern of the first and second electrodes 13, 14 in more detail. It will be appreciated from FIG. 5 that the alternating pattern of first and second electrodes 13, 14 may be provided wherein the first and second electrodes are offset from each other in the axial direction, preferably evenly spaced. As such, the alternating pattern in the transverse direction may be provided wherein the first and second electrodes 13, 14 are spaced apart from each other with a first pitch (h) in the axial direction. That is to say a leading edge (in the axial direction) of each first electrode 13 may be offset in the axial direction from a leading edge of each second electrode 14 by a distance h.

As discussed above, the ion mobility analyser 10 extends in the axial direction. Each of the first and second electrode assemblies 11, 12 repeats rows of the alternating pattern of first and second electrodes 13, 14 in order to define the axial length of the ion mobility analyser 10. It will be appreciated from FIGS. 2-5 that the alternating pattern of first and second electrodes 13, 14 is repeated along the axial direction N times in order to provide the first and second assemblies 11, 12. In some embodiments, N may be an integer, for example, at least 5, at least 10, or at least 15.

In the alternating pattern shown in FIG. 5, the first and second electrodes 13, 14 are arranged such that they are evenly spaced apart from each other in the transverse direction. As such, the first and second electrodes 13, 14 may be spaced apart from each other with a second pitch (H) in the transverse direction. That is to say, a leading edge (in the transverse direction) of each first electrode 13 may be offset in the transverse direction from a leading edge of each second electrode 14 by a distance H.

Figure 6:
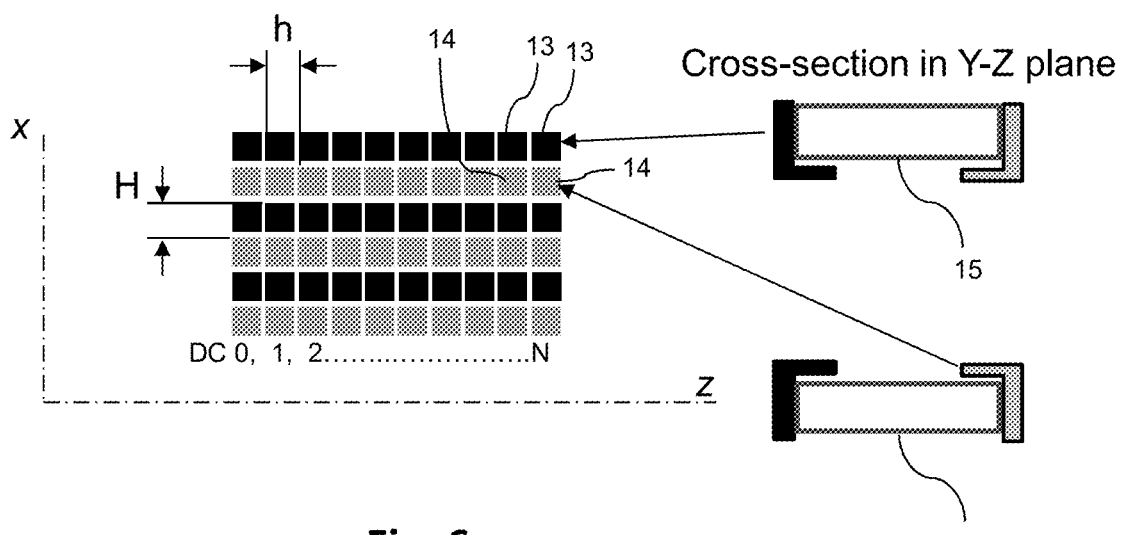
FIG. 6 shows a schematic diagram of a second arrangement of first and second electrodes for an electrode assembly.

The electrode arrangement shown in FIGS. 2-5 is one possible example of the alternating pattern of first and second electrodes 13, 14 that may be provided in accordance with this disclosure. For example, in some embodiments the alternating pattern of first and second electrodes in the transverse direction may not include an axial offset. An example of such a pattern is shown in FIG. 6. FIG. 6 shows a schematic diagram of the first and second electrodes 13, 14 which may be used to form the first and second electrode assemblies 11, 12. As shown in FIG. 6, the first and second electrodes 13, 14 extend in the transverse direction in rows. The first and second electrodes 13, 14 of each row are arranged in an alternating pattern. The first and second electrodes 13, 14 in each row are uniformly spaced apart from each other in the transverse direction with a second pitch H. The alternating pattern of first and second electrodes 13, 14 is also repeated in the axial direction N times (i.e. there are N rows of first and second electrodes 13, 14). Where the electrodes are repeated in the axial direction the rows of electrodes are spaced apart from each other in the axial direction with a first pitch h. In some embodiments the first pitch h is smaller than the second pitch H. While the embodiment of FIG. 6 shows that the alternating pattern is repeated in the axial direction with the same electrode alignment, it will be appreciated that the repeated pattern could also be alternated in the axial direction. As such, a chequerboard pattern of first and second electrodes 13, 14 could also be provided in order to provide a first and/or second electrode assembly 11, 12 with an alternating pattern according to the embodiments of the disclosure.

The diagram shown in FIG. 6 also shows an exploded view of a cross-section in the YZ plane. In contrast to the flat shaped first and second electrodes (e.g. flat plates) of the embodiment shown in FIG. 5, the first and second electrodes of the embodiment of FIG. 6 have overhanging ridges, which enable negligible potential modulation along the z-direction compared to the more significant modulation along the z-direction of the FIG. 5 embodiment. As shown in the cross-section of the YZ plane, one or more spacers 15 may be provided between each of the first and second electrodes. The spacers 15 may be formed from an insulating material. The spacers 15 are not connected to the RF or DC power supplies. Whilst spacers 15 are shown for the embodiment of FIG. 6 it will be appreciated that spacers may also be provided in the first and second electrode assemblies 11, 12 of FIG. 5 or any other electrode arrangement within the scope of this disclosure.

In some embodiments, it will be appreciated that the alternating patterns of first and second electrodes 13, 14 shown in the embodiments of FIGS. 5-6 may be provided planar printed circuit boards (PCBs). Such planar PCBs may extend in an XZ plane having the alternating first and second electrodes 13, 14 printed thereon. Preferably, the printed circuit board on which the first and second electrodes are printed comprises a dielectric material.

In some embodiments each printed circuit board on which the first and second electrodes 13, 14 are printed may have a dielectric loss of no greater than 0.01. In some embodiments, the planar printed circuit boards may have grooves formed in the printed circuit board, the grooves extending in the spaces between each of the first and second electrodes 13, 14 formed in the respective XZ plane. The grooves may be provided between adjacent electrodes in order to increase tracking distance. In some embodiments, the grooves between opposite RF phases (i.e. grooves between adjacent first and second electrodes 13, 14) could have a narrow DC stripe at their bottoms.

In other embodiments, the printed circuit board may be covered by an isolating or very high Ohmic resistance lacquer, for example a lacquer having a sheet resistance of at least $1 \times 10^9$, or more preferably $1 \times 10^{10}$ $\Omega$/square.

In order to confine ions within the ion drift channel, RF potentials may be applied to the first and second electrodes 13, 14 of the first and second electrode assemblies 11, 12. As shown in FIGS. 3 and 4, a first RF potential (RF1) may be applied to the first electrodes 13, and a second RF potential (RF2) may be applied to the second electrodes 14 of the first and second electrode assemblies 11, 12. The first and second RF potentials may have an opposite polarity to each other (e.g. RF1=−RF2). As such, the first and second RF may provide an alternating RF field which confines ions to the ion drift channel in a central region of the ion guide when in use. Such a pseudopotential field provides for ion confinement along the transverse direction of the ion drift channel. Generally, a different number of RF waveforms could be applied as known in the art, e.g. 3 or 4 phases with corresponding phase shifts between them.

The RF potentials are applied to the first and second electrodes 13, 14 of each of the first and second electrode assemblies 11, 12 in order to provide a multipolar electric field extending in the transverse direction (x-direction) of the ion mobility analyser 10. The multipolar electric field provides an electric field which is configured to confine ions to a central part of the ion drift channel. Effectively, ion are confined to a plane extending along a central region of the ion drift channel. Said, plane, or "ion carpet" provides for the ability to analyse, or separate ions according to their mobility along the axial direction of the ion mobility analyser 10. As ions within the ion carpet extend along the transverse direction, space charge effects are reduced relative to axially symmetrical ion mobility analysers where ions are confined about an axis.

The provision of RF potentials to provide an ion carpet is further discussed in "RF ion carpets: The electric field, the effective potential, operational parameters and an analysis of stability" S, Schwarz et. Al, *Int. J Mass Spectrom.* 299 (2011) 71-77. In view of this disclosure, it will be appreciated that for the first and second electrode assemblies discussed above, the potential provided in the axial direction (z-direction) should vary smoothly.

Accordingly, it is understood that one possible arrangement of first and second electrodes to provide a suitable multipolar electric field is described above in relation to FIGS. 1-4. For such electrode assemblies, having electrode spacings of a first pitch h in the axial direction and second pitch H in the transverse direction, the time (t) varying electric potential U(x, y, z, t) in the ion drift channel (i.e. in a region far from a boundary region of the ion mobility analyser 10) may be approximately modelled as:

$$U(x, y, z, t) = \cos(\omega t) \cdot \sum_{n=1}^{\infty} C_n \cdot \sin\left(\frac{\pi x}{H}n\right) \cdot \left[1 + D_n \cdot \cos\left(\frac{2\pi z}{h}n\right)\right] \cdot \cosh\left(\frac{\pi y}{H}n\right)$$

where $C_n$ and $D_n$ are constants for the $n^{th}$ harmonic. $C_n$ and $D_n$ effectively represent amplitudes of the $n^{th}$ harmonic. Constants $D_n$ reflects modulation of potential due to difference in RF phases on subsequent plates and could vary between close to 1 in case of deep modulation of FIG. 5, and close to 0 in case of quasi-continuous RF phases of FIG. 6. In the ion mobility analyser, the first and second electrode assemblies are spaced apart from the central axis of the ion trap by a distance G, and the first and second electrodes alternate in the transverse direction with the first pitch H. Where the spacing from the central axis G is at least 0.5 H (i.e. G≥0.5 H), the resulting effective quasi-potential can be approximated as:

$$U_{eff}(y) = \sum_{n=1}^{\infty} C'_n \cdot \cosh\left(\frac{\pi y}{H}n\right)$$

In the above approximation, the constant $C_n$ is proportional to $C_n$. It will be appreciated from the above equation that the effective quasi-potential $U_{eff}(y)$ is not dependent on the x and z direction. Thus, the quasi-potential is substantially constant along the x-z plane, i.e. the plane of symmetry of the ion guide. In some embodiments, G≥H, or more preferably G≥2 H. In some embodiments, G≤10 H, or more preferably G≤5 H. Thus, the quasi-potential is substantially constant along the x-z plane, i.e. the plane of symmetry of the ion mobility analyser 10. As such, ions in the central region of the ion drift channel are effectively free to distribute along the transverse direction and are also free to move in the axial direction, subject to any control by an applied DC potential. As such, the application of such potentials provides for ion drift channel suitable for the performance of ion mobility analysis. For example, in some embodiments, the first and second electrode assemblies may be supplied with an RF potential with a peak to peak amplitude ($V_{pp}$) of about at least 100 $V_{pp}$. In some embodiments, the RF potential may be no greater than about 400 $V_{pp}$ in order to avoid Paschen discharges at the operating pressure of the ion mobility analyser. The RF potential may be applied with a frequency of about 0.5 MHz to about 5 MHz.

DC voltages may also be applied to the first and second electrode assemblies 11, 12. In some embodiments, the same DC voltage may be applied to each of the first and second electrode assemblies 11, 12. In the embodiment of FIGS. 2-5, a DC voltage ($DC_n$) may be applied independently to each row of electrodes (for n=0, 1, 2 . . . N rows of electrodes) for each of the first and second electrode assemblies 11, 12. As such, the first and second electrode assemblies may be configured to provide a variable DC voltage bias along the axial length of the ion mobility analyser 10. Such a variable DC profile may be used to provide a DC barrier at a point along the length of the ion guide for the purposes of performing trapped ion mobility spectrometry (TIMS) In some other embodiments of ion mobility spectrometry, a variable DC profile may be used to provide an axial potential gradient to transmit ions through the ion guide. For example, in some embodiments, a DC potential of about at least 50 V may be applied. In some embodiments, the DC potential applied may be no greater than 350 V in order to avoid Paschen discharge.

The ion mobility analyser 10 may also be provided with first and second side electrode assemblies 16, 17. The side electrode assemblies 16, 17 are arranged on opposing sides of the ion drift channel, arranged across the transverse direction of the ion guide. The side electrode assemblies 16, 17 are each configured to provide an electrical potential, when in use, which confines ions within the ion drift channel. That is to say, the first and second side electrode assemblies 16, 17 prevent ions from escaping in the transverse direction of the ion drift channel. In some embodiments, the side electrode assemblies 15, 16 may be provided with a repulsive DC potential (same polarity as the ions) to keep the ions sufficiently far from the sides of the ion drift channel to avoid the ions experiencing differences in gas velocity.

FIGS. 3 and 4 show an example of first and second side electrode assemblies 16, 17 for the ion mobility analyser 10. Each of the first and second side electrode assemblies 16, 17 comprises a plurality of third and fourth electrodes 18, 19. As shown in FIG. 3, the first side electrode assembly comprises a plurality of third electrodes 18. As shown in FIG. 4, the second side electrode assembly 17 comprises a plurality of fourth electrodes 19. The third and fourth electrodes 18, 19 are arranged in an alternating pattern in the axial direction along the length of the ion mobility analyser 10. As shown in FIGS. 3 and 4, the first and second side electrode assemblies 16, 17 may be provided with RF and DC potentials to confine the ions within the ion drift channel. For each row of electrodes of the first and second side electrode assemblies 16, 17, the respective electrodes may be provided with the same RF potential as the first and second electrode assemblies 11, 12. As such, in FIG. 3, the third electrodes 18 of the first and second side electrode assemblies 16, 17 are provided with the first RF potential (RF1). In FIG. 4, the fourth electrodes 19 of the first and second side electrode assemblies 16, 17 are provided with the second RF potential (RF2).

For each row of electrodes of the first and second side electrode assemblies 16, 17, the respective electrodes may also be provided with the same DC potential as the respective row of the first and second electrode assemblies 11, 12. As such, in FIG. 3, the third electrodes 18 of the $n^{th}$ row of the first and second side electrode assemblies 16, 17 are provided with the $n^{th}$ DC potential ($DC_n$). In FIG. 4, the fourth electrodes 19 of the first and second side electrode assemblies 16, 17 of the n+1 row are provided with the n+1 DC potential ($DC_{n+1}$).

In some embodiments, the third and fourth electrodes 18, 19 of the first and second side electrode assemblies 16, 17 may also be provided with an additional offset voltage ($\Delta$) relative to the voltages applied to the first and second electrode assemblies 11, 12. The offset voltage may be an additional DC voltage. For example, the offset voltage ($\Delta$) may be provided of a similar polarity as the ions to be confined in the ion drift channel. Such an offset voltage may be configured to guide ions away from the side electrode assemblies although in many cases the RF quasi-potential resulting from the application of RF1 and RF2 would keep ions sufficiently far from the ends to avoid ions in the ion drift channel interacting with a boundary layer extending from the side electrodes. In other embodiments, the offset voltage may also include an additional RF voltage.

The DC and RF voltages for the first and second electrode assemblies 11, 12 and the first and second side electrode assemblies 16, 17 may be provided by a power supply and controller (not shown). The power supply is configured to provide the DC and RF power to the electrodes. The power to be supplied to each of the first, second, third and fourth electrodes 13, 14, 18, 19 may be specified by the controller according to the type of ion mobility analysis to be performed.

The distance between the first and second side electrode assemblies 16, 17 in the transverse direction (x-direction) may be at least 2x, 3x, 4x, 5x, 10x, 15x or 20x greater than the distance between the first and second electrode assemblies 11, 12 in the direction perpendicular to the transverse direction (y-direction).

The ion mobility analyser 10 may be provided within a vacuum chamber 40, for example as shown in FIG. 1. The vacuum chamber 40 may be configured to provide a pressure in the range of 1 to 10 mbar, or in the range of 2 to 4 mbar for the ion mobility analyser for performing ion mobility analysis in TIMS. For other types of ion mobility analysis, different pressures may be preferred. The vacuum chamber 40 may be fluidly connected to a vacuum pump (not shown) in order to provide the desired pressure.

A source of ions 60 may be provided within the vacuum chamber 40. The source of ions 60 may be configured to inject ions into the vacuum chamber 40 in such a manner that they are directed to the ion guide 10 for analysis, e.g. through a transfer tube. As shown in FIG. 1 the source of ions 60 may be located in a range of different positions. For example, the source of ions 60 may be arranged to inject ions into the vacuum chamber in a direction generally transverse to the axial direction of the ion mobility analyser 10 (i.e. position i) shown in FIG. 1). Alternatively, as shown in positions ii) and iii), the source of ions 60 may inject ions in a direction which is generally parallel to the axial direction of the ion guide 10. In some embodiments, for example as shown in position ii) the source of ions 60 may be positioned offset from the central axis of the ion mobility analyser 10. In some embodiments, for example as shown in position iii), the source of ions 60 may be aligned to coincide with the central axis of the ion guide 10. In position iv), the source of ions 60 may be arranged to inject ions at an angle relative to the axial direction of the ion mobility analyser 10. As such, ions injected in such a manner will have a component of their velocity in the axial direction of the ion mobility analyser and a component of their velocity in a direction orthogonal to the axial direction of the ion mobility analyser. In some embodiments, a plurality of ion sources may be provided, the various ion source 60 arranged at any of the positions indicated in FIG. 1. As such, different ion sources may be multiplexed together for ion mobility analysis. For example, one ion source may be a first source of sample ions (e.g. an ESI source), another source may be a second source of sample ions (e.g. a MALDI source), and another source may be a source of calibrant ions, etc.

The source of ions 60 may be generated from a sample to be analysed. Ions may be generated from such a sample using an electrospray ionization source (ESI source). The ESI source (not shown) may be supplied with sample molecules from, for example, a liquid chromatography source, or any other suitable source of sample. Sample molecules may then be ionized using the ESI source to provide a source of ions. The ions may be transported form the ESI source to the ion mobility analysis system 1 by means of a multipole ion guide or other forms of ion transportation known to the skilled person. Alternatively, a matrix-assisted laser desorption/ionization (MALDI) source may be used to provide the source of ions. Ions may be injected into the ion mobility analysis system 1 as a continuous stream of ions, or as a series of ion packets depending on the type of ion mobility analysis to be performed. The location of the source of ions 60 and the angle of injection relative to the axial direction of the ion mobility analyser 10 will depend on the type of ion mobility analysis to be performed by the ion mobility analyser 10.

While in some embodiments the source of ions 60 may directly inject ions into the ion mobility analyser, in some embodiments an entrance funnel 20 is provided between the source of ions 60 and the ion mobility analyser 10. For example, the ion mobility analysis system 1 of FIG. 2 includes an entrance funnel 20. The entrance funnel 20 is configured to collect and to guide ions into the ion mobility analyser 10 from the ion source 60.

Figure 7:
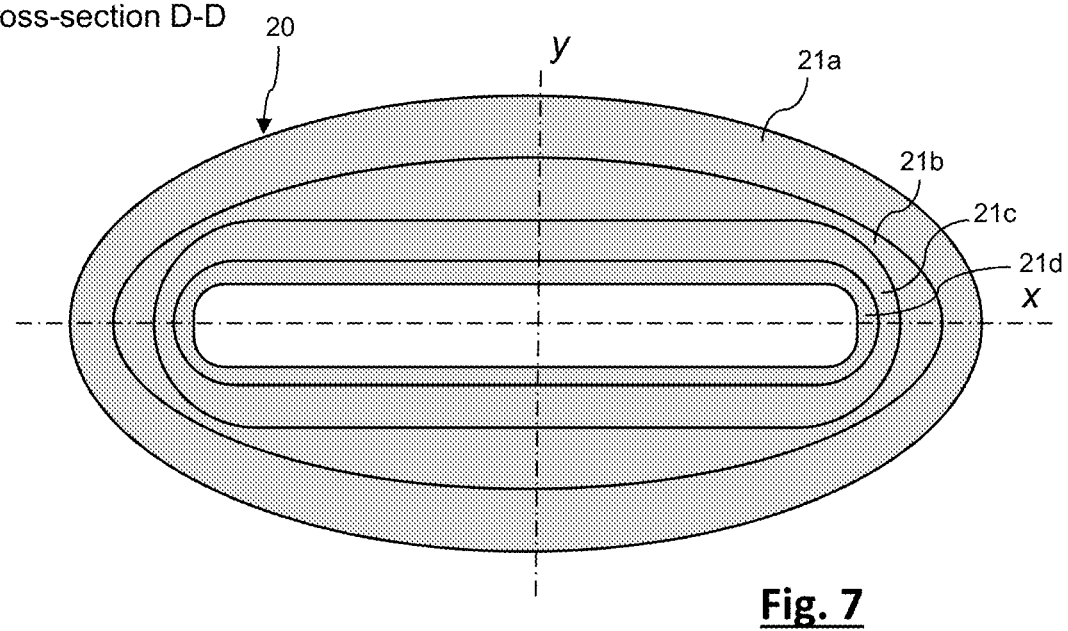
FIG. 7 shows a schematic diagram of a first arrangement of first and second electrodes for an exit ion funnel.

The entrance funnel 20 shown in FIG. 2 comprises a plurality of first annular electrodes 21. A cross-section of the entrance funnel though the plane D-D of FIG. 2 is shown in FIG. 7. As shown in FIG. 7, the plurality of annular electrodes 21*a*, 21*b*, 21*c*, 21*d* are arranged concentrically about the central axis of the ion drift channel of the ion mobility analyser 10. The plurality of first annular electrodes 21*a*, 21*b*, 21*c*, 21*d* each define an opening having a cross-sectional area. Ions from the source of ions 60 are directed into the openings of the plurality of first annular electrodes 21*a*, 21*b*, 21*c*, 21*d*. The cross-sectional area of each opening of the plurality of first annular electrodes decreases from the source of ions 60 towards the entrance end of the ion mobility analyser. The openings of the plurality of first annular electrodes 21a, 21b, 21c, 21d may be configured to shape the flow of ions from the source of ions to conform to the shape of the generally elongate (in the transverse direction) ion drift channel of the ion mobility analyser. Thus, the first annular electrodes 21a, 21b, 21c, 21d of the entrance funnel 20 are elliptical, rather than rotationally symmetric like conventional ion funnels.

The plurality of first annular electrodes 21a, 21b, 21c, 21d may be provided with an electrical potential in order to confine ions towards the central axis of the entrance funnel. For example, the plurality of first annular electrodes 21a, 21b, 21c, 21d may be provided with an alternating RF potential in order to provide a confining pseudopotential in a manner similar to a stacked ring ion guide. In some embodiments, the plurality of first annular electrodes 21a, 21b, 21c, 21d may be provided with the first and second RF potentials (RF1, RF2) in an alternating manner (i.e. first annular electrodes 21a, 21c, are provided with RF1 and first annular electrodes 21b, 21d are provided with RF2). The plurality of first annular electrodes 21a, 21b, 21c, 21d may also be provided with a DC potential in addition to the RF potential. In some embodiments, each first annular electrode 21 may be provided with a DC potential $DC_m$ for the $m^{th}$ first annular electrode, where there are M first annular electrodes (m=1, 2, 3 . . . M). In the embodiment of FIG. 2 there are four first annular electrodes (i.e. M=4). In other embodiments, there may be at least three first annular electrodes 21, or at least: 5, 7, 9 or 11 first annular electrodes 21.

In addition to the entrance funnel 20, an exit funnel 30 may be provided at an exit end of the ion guide 10 in order to collect ions which are exiting the ion drift channel. An example of an exit funnel according to this disclosure is shown in FIGS. 1 and 2. Similar to the entrance funnel 20, the exit funnel 30 may comprise a plurality of second annular electrodes 31. As shown in FIG. 2, the plurality of second annular electrodes 31a, 31b, 31c, 31d, 31e may be arranged concentrically about the central axis of the ion mobility analyser 10.

Figure 8:
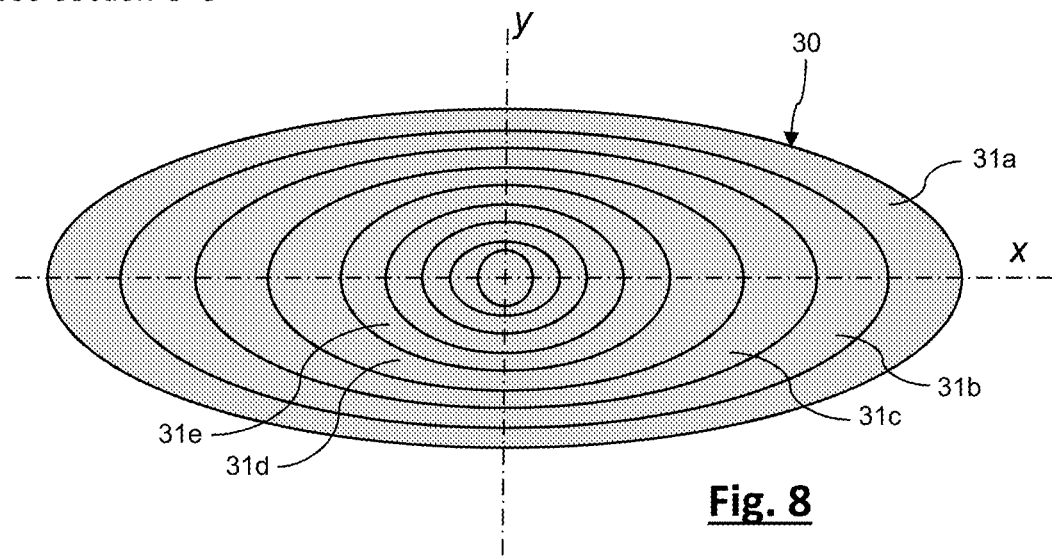
FIG. 8 shows a schematic diagram of a second arrangement of first and second electrodes for an entrance ion funnel.

A cross section of the exit funnel 30 through the plane C-C shown of FIG. 2 is shown in FIG. 8. The plurality of second annular electrodes 31a, 31b, 31c, 31d, 31e each define an opening having a cross-sectional area. Ions exiting the ion mobility analyser 10 are directed into the openings of the plurality of second annular electrodes 31a, 31b, 31c, 31d, 31e. The cross-sectional area of each opening of the plurality of second annular electrodes 31a, 31b, 31c, 31d, 31e decreases from the ion mobility analyser 10 towards the exit end 32 of the exit funnel 30. The openings of the plurality of second annular electrodes 31a, 31b, 31c, 31d, 31e may be configured to direct the output of ions from the ion mobility analyser 10 into a further ion guide, or a mass analyser. In particular, the exit funnel 30 may be provided to collect the ions exiting the elongated ion drift channel and to focus the ions into a suitable region for further processing or analysis. Similar to the entrance funnel 20, the annular electrodes of the exit funnel 30 are elliptical, rather than rotationally symmetric.

In the embodiment of FIG. 2, ions may exit the exit funnel 30 at the exit end 32 of the exit funnel. The exit end 32 is concentric with the central axis of the ion mobility analyser 10. In other embodiments, the exit funnel 30 may be provided with one or more slits in the plurality of second annular electrodes 31 through which ions may exit. Ion may be diverted through the one or more slits by means of DC bias applied to the plurality of second annular electrodes 31.

The plurality of second annular electrodes 31a, 31b, 31c, 31d, 31e may be provided with an electrical potential in order to confine ions towards the central axis of the exit funnel 30. For example, the plurality of second annular electrodes 31a, 31b, 31c, 31d, 31e may be provided with an alternating RF potential in order to provide a confining pseudopotential in a manner similar to a stacked ring ion guide. In some embodiments, the plurality of second annular electrodes 31a, 31b, 31c, 31d, 31e may be provided with the first and second RF potentials (RF1, RF2) in an alternating manner (i.e. second annular electrodes 31a, 31c, 31e are provided with RF1 and second annular electrodes 31b, 31d are provided with RF2). The plurality of second annular electrodes 31a, 31b, 31c, 31d, 31e may also be provided with a DC potential in addition to the RF potential. In some embodiments, each second annular electrode 31 may be provided with a DC potential $DC_k$ for the $k^{th}$ second annular electrode, where there are K second annular electrodes (k=1, 2, 3 . . . K). In the embodiment of FIG. 2 there are five second annular electrodes (i.e. K=5). In other embodiments, there may be at least three second annular electrodes 31, or at least: 5, 7, 9 or 11 second annular electrodes 31.

As shown in FIG. 1, a source of gas flow 50 may also be provided within the vacuum chamber 40. The source of gas flow 50 may be configured to direct a flow of gas towards the ion mobility analyser 10. As shown in FIG. 1 the source of the gas flow 50 is configured to direct a flow of gas to the entrance funnel 20 which in turn provides gas flow towards the ion mobility analyser 10. The source of gas flow 50 may be configured to provide a source of generally laminar gas flow through the ion drift channel of the ion mobility analyser. In particular, the source of gas flow may be configured to provide a gas flow such that a boundary layer of the gas flow extending from each of the first and second electrode assemblies 11, 12 does not extend into a region where ions are confined in the ion guide. As such, a boundary layer of the laminar gas flow extending from each of the first and second electrode assemblies 11, 12 is spaced apart from the ion drift channel. Accordingly, ions travelling through the ion drift channel may be subject to generally uniform, laminar, gas flow, rather than gas flow subject to the boundary layer effect. By providing such gas flow, ions may be transported in a uniform manner through the ion guide. The elongation of the ion drift channel in the transverse direction does not affect the ion transport properties of the ion guide, as the gas flow through the ion guide is generally uniform in the ion drift channel.

In some embodiments, the gas flow is provided such that a thickness of the boundary layer extending from each of the first and second electrode assemblies 11, 12 in the direction normal to the transverse direction is no greater than 30% of the spacing between the first and second electrode assemblies. As such, the ion mobility analyser 10 includes a central region which is at least 40% of the spacing between the first and second electrode assemblies 11, 12 where the gas flow is generally laminar.

It will be appreciated that the gas flows required to provide the desired laminar flow in the ion drift channel will depend on the geometry of the ion mobility analyser 10. For an ion mobility analyser having a spacing between the first and second electrode assemblies 11, 12 of about 8-10 mm, and extending in the transverse direction about 100-200 mm, a gas flow velocity in the range of 100-200 m/s may be provided. In order to provide such a gas flow at 2-4 mbar of pressure, gas flow rates of 80-400 L/s need to be sustained.

While such flow rates flow could be supplied by an increased ion transfer tube (e.g. using slot design as described in U.S. Pat. No. 8,309,916), the design of the vacuum pump size would be challenging. Thus, in order to provide the desired gas flow, the present disclosure provides for an additional source of gas flow 50, which is additional to any gas flow provided by the source of ions 60. As such, in some embodiments, less than 80% of the total gas flow though the ion mobility analyser 10 is provided by the source of ions 60. More preferably, less than: 50%, 25%, 10%, 5%, 2%, or 1% of the total gas flow is provided by the source of ions. The remainder of the gas flow may be provided by the source of gas flow 50.

In the embodiment of FIG. 1, the source of gas flow 50 is laminarized recirculator circuit. As such, the source of gas flow 50 is provided by recirculating gas flow exiting the ion mobility analyser 10, wherein the gas flow provided to the entrance of the ion mobility analyser is laminar. Ion-carrying gas flow from the source of ions 60 may mix with the source of gas flow 50 into during transit through the entrance funnel such that is does not disturb the overall laminar flow.

As shown in FIG. 1, the laminarized recirculator circuit comprises a recirculating pump 52, a laminar flow module 54 and gas flow conduit 56. The recirculating pump 52 is configured to draw gas flow from the exit end of the ion mobility analyser 10 and output said gas to the laminar flow module 54, which is fluidly connected to the recirculating pump 52. The output of the laminar flow module 54 is fluidly connected to the gas flow conduit 56 which directs the gas flow to the desired location in the vacuum chamber 40. As shown in FIG. 1, the gas flow conduit 56 is configured to output gas flow in a direction which is generally aligned with the axial direction of the ion mobility analyser 10.

The recirculating pump 52 may be any suitable pump for providing the desired amount of gas flow at the desired pressure. For example, in the embodiment of FIG. 1, the recirculating pump 52 may be configured to provide gas flows in the range of 50 to 400 L/s. Preferably, the gas flow output by the recirculating pump may be controlled by a controller (not shown) As such, the recirculating pump 52 may be configured to provide a variable amount of gas flow, up to substantially all of the gas flow required by the ion mobility analyser 10 for laminar flow. In some embodiments, the recirculatory pump 52 may be configured to provide a pressure head of about 0.5-1 mbar in order to provide the gas flow. A wide range of pumps could be used to provide a suitable gas flow, for example a radial turbo compressor or centrifugal blowers, screw pumps, boosters etc., such as those available from Celeroton (RTM) or vacuum pump vendors.

The laminar flow module 54 is configured to transform the gas flow output from the recirculating pump 52 to a laminar flow. For example, the laminar flow module 54 may comprise one or more laminar flow diffusers. The precise design of the laminar flow module 54 will depend on the overall size of the recirculating pump 52 and the output from the recirculating pump 52. The laminar flow module may homogenize the gas flow and spreads. The laminar flow module, in combination with the gas flow conduit 56 may be configured to spread the gas flow such that a uniform gas flow is provided across the entire cross-sectional area of the ion mobility analyser 10. As such, the gas flow is laminar and uniform along the elongated transverse direction (x-direction) of the ion drift channel. In some embodiments, the gas flow provided may be substantially uniform across the entire entrance opening of the entrance funnel.

As mentioned above, the source of gas flow 50 may provide gas flow through the ion mobility analyser 10, wherein the boundary layers on opposing sides do not meet in the central ion drift channel. As such, the boundary layers are generally confined to regions relatively close to the first and second electrode assemblies (i.e. less than 30% of the thickness of the ion drift channel). In some embodiments, such a gas flow may be provided wherein the laminar gas flow through the ion guide has a Mach number of at least 0.05. More preferably, the Mach number for the laminar gas flow may be at least 0.1, or at least 0.2, or at least 0.3. Preferably, the source of gas flow 50 provides gas flow with such a Mach number through the ion mobility analyser 10, the source of gas flow 50 provides the majority of the gas flow through the ion mobility analyser 10. That is to say, under such Mach numbers, it is preferable that the source of gas flow 50 provides a greater amount of gas flow than the source of ions 60.

In some embodiments, pressure and/or temperature sensors may be provided at an intake to the recirculating pump 52 and at the output of the gas flow conduit 56. By measuring pressure and temperature on both ends (input and output) of the laminarized recirculator circuit the gas flow provided as the source of gas flow may be controlled and kept stable. For example the pressure and temperature sensors may be connected to controller for the purpose of providing feedback control for the recirculating pump 52.

Next, a method of operating the ion mobility analysis system 1 will be described with reference to FIGS. 1-2.

The source of gas flow 50 may be operated to provide a continuous, uniform flow of gas through the ion mobility analyser 10 from the entrance funnel 20 towards the exit funnel. As discussed above, the gas flow is provided with a sufficient flow rate that the boundary layer extending from the first and second electrode assemblies 11, 12 does not extend into the ion drift channel (at least the central 40% of the ion guide). The boundary layer extending from the first and second side electrode assemblies 16, 17 similarly does not extend into the ion drift channel.

Ions may be injected from the source of ions 60. Ions may be directed into the entrance funnel 20 by the source of gas flow 50 and/or an applied potential (e.g. a DC potential). Ions entering the entrance funnel 20 are focused towards a plane extending in the transverse and axial directions of the ion mobility analyser 10. The RF potentials applied to the first and second electrode 13, 14 of the ion mobility analyser 10 and the first annular electrodes of the entrance funnel 20 confine ions to the central, ion drift channel of the ion mobility analyser. Ions may then travel along the ion drift channel of the ion mobility analyser 10 in accordance with any DC potential applied to the first and second electrodes of the ion mobility analyser. For a TIMS analysis, a DC barrier may be applied at a point along the ion mobility analyser by applying a suitable DC potential to one or more rows of electrodes. Ions may be trapped upstream of the DC barrier and held against the DC barrier by the gas flow. The DC barrier may be varied in order to separate the trapped ions according to their mobility. Ions with a sufficient mobility to overcome the DC barrier continue to travel along the ion drift channel of the ion mobility analyser 10 to the exit funnel 30. After ions are trapped in the ion mobility analyser, ions may be eluted according to their mobility by scanning electrical field at the barrier as known in the art (see for example "Trapped ion mobility spectrometry: A short review" M.E. Ridgeway et al. International Journal of Mass Spectrometry 425 (2018) 22-35).

Ions entering the exit funnel 30 may be transported by the plurality of second annular electrodes 31a, 31b, 31c, 31d, 31e of the exit funnel 30 to an exit aperture for detection or further analysis. For example, ions may be transported to a mass analyser after separation according to their mobility in order to determine a mass of the separated ions. The mass analyser may be a Fourier Transform mass analyser such as an orbital trapping mass analyser, a time of flight mass analyser, or an ion trap mass analyser.

Accordingly, a method of ion mobility analysis may be provided using the ion mobility analysis system 1 described above. In the method described above, the ion mobility analysis performed is a TIMS analysis, where ions are separated based on the time taken for the ions to elute from the ion drift channel. In other embodiments, ions could be separated based on the time taken for the ions to travel along the ion drift channel without any trapping. In such an embodiment, the source of gas flow could be provided to oppose the direction of ion travel in order to increase the effective length of the ion drift channel.

It should be noted that in some embodiments, especially when utilising gas recirculation, the gas flow direction may be opposite to the direction of gas flow from the ion source. The advantage of such an approach is the elimination of any solvent cluster ions and droplets that may be present in gas flow from the ion source before they enter the ion funnel. In this case, DC potential gradient along the axis will be accelerating for ions rather than decelerating as in the case above.

The ion mobility analysis system 1 of FIG. 1 utilises an ion mobility analyser 10 having an ion drift channel which is substantially planar. According to a second embodiment, an ion mobility analyser 110 may be provided where the ion drift channel is quasi-planar, by elongating the ion drift channel in the transverse direction along an arc, or circle, rather than a straight line.

Figure 9:
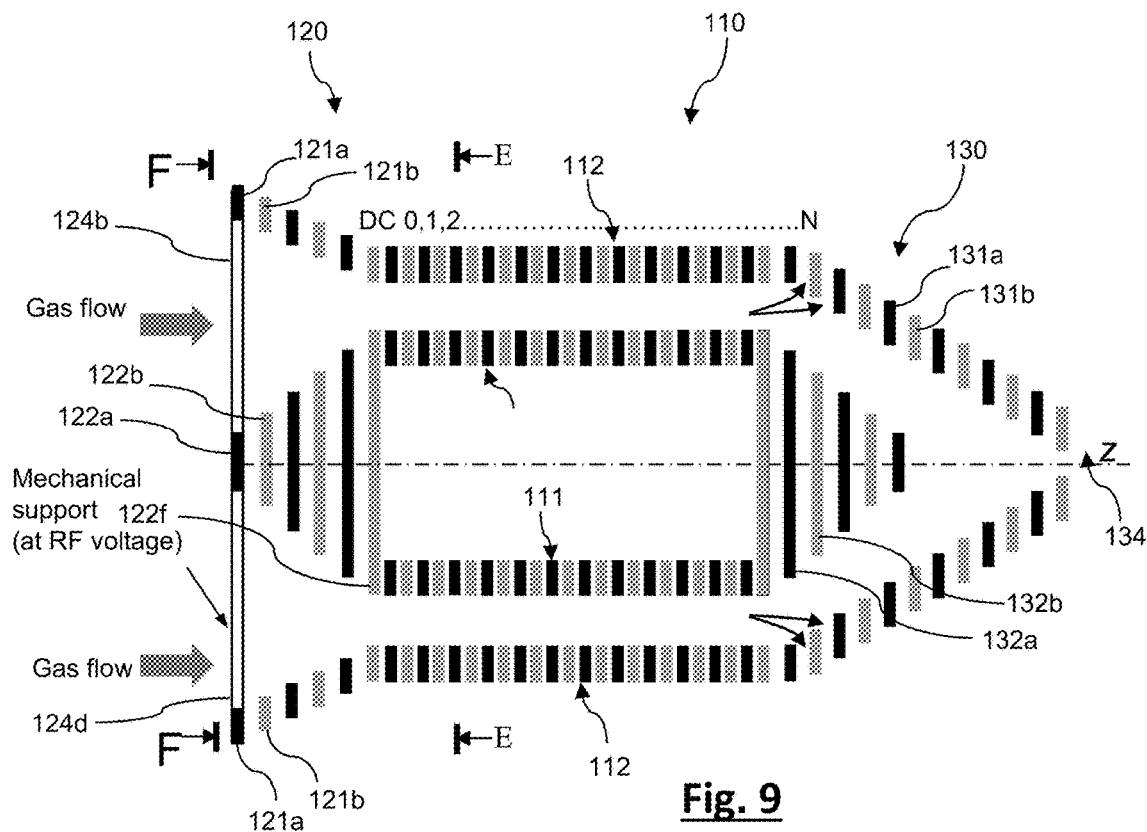
FIG. 9 shows a schematic diagram of a cross section of an ion mobility analyser parallel to the axial direction of the ion mobility analyser according to another embodiment of the disclosure.
Figure 10:
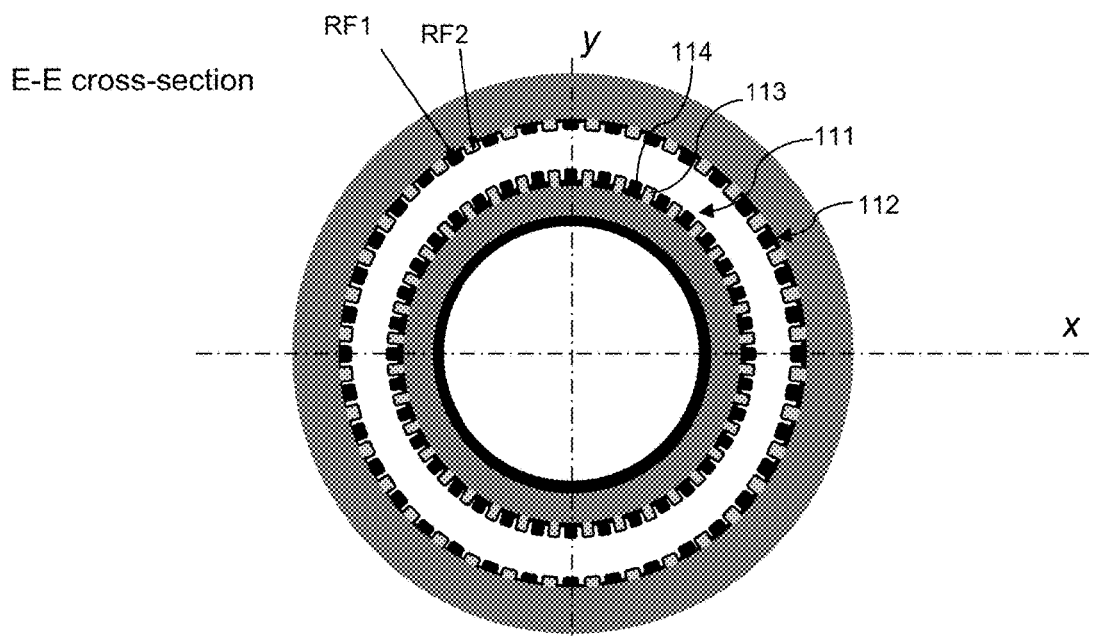
FIG. 10 shows a schematic diagram of a cross section of an ion mobility analyser transverse to the axial direction at a first point along the ion mobility analyser of FIG. 9.

An example of such an ion mobility analyser 110 is shown in FIGS. 9 and 10. Similar to the first embodiment, the ion mobility analyser 110 comprises first and second electrode assemblies 111, 112. The first and second electrode assemblies 111, 112 each extend in the axial direction and are spaced apart from each other. As shown in FIGS. 9 and 10, the first and second electrode assemblies 111, 112 may each be provided extending along concentric circles or along concentric arcs in a plane transverse to the axial direction. By providing the first and second electrode assemblies 111, 112 in this manner, an elongated ion drift channel may be provided in a direction transverse to the axial direction, wherein the ion drift channel is elongated about a concentric circle or along a concentric arc.

The ion mobility analyser 110 is arranged between an entrance funnel 120 and an exit funnel 130 in a manner similar to the ion mobility analyser 10 of FIG. 2. In the ion mobility analyser 110 of FIG. 9, the first and second electrode assemblies 111, 112 are each provided as concentric circles. A cross-section of the first and second electrode assemblies 111, 112 transverse to the axial direction is shown in FIG. 10. As shown in FIG. 10, the first electrode assembly 111 includes a plurality of first electrodes 113 and a plurality of second electrodes 114. The plurality of first and second electrodes 113, 114 are arranged in an alternating pattern about a circle centred on the central axis of the ion mobility analyser 110. The second electrode assembly 112 also includes a plurality of first and second electrodes 113, 114. The first and second electrodes 113, 114 of the second electrode assembly 112 are also arranged in an alternating pattern. The first and second electrodes 113, 114 of the second electrode assembly 112 are arranged as a concentric circle centred on the central axis of the ion mobility analyser 110. As such, the first and second electrode assemblies 111, 112 are provided as concentric circles such that the electrode assemblies are spaced apart by a first distance in the radial direction to provide an ion drift channel between the electrode assemblies. The ion drift channel is effectively elongated in a direction transverse to the axial direction, wherein in the ion drift channel is elongated such that it forms a continuous circle.

The first and second electrode assemblies 111, 112 shown in FIGS. 9 and 10 each provide an assembly of alternating first and second electrodes 113, 114 on substantially cylindrical surfaces. It will be appreciated that, similar to the embodiments of FIGS. 5 and 6, such a cylindrical arrangement of first and second electrodes may be provided by way of a PCB having the first and second electrodes 113, 114 printed thereon. In embodiments where the ion drift channel is quasi-planar (e.g. a cylindrical ion drift channel as per FIGS. 9 and 10), the printed circuit board may be a flexible printed circuit board. For example, a flexible printed circuit board may comprise polyester or polyimide (e.g. Kapton (RTM)).

Figure 11:
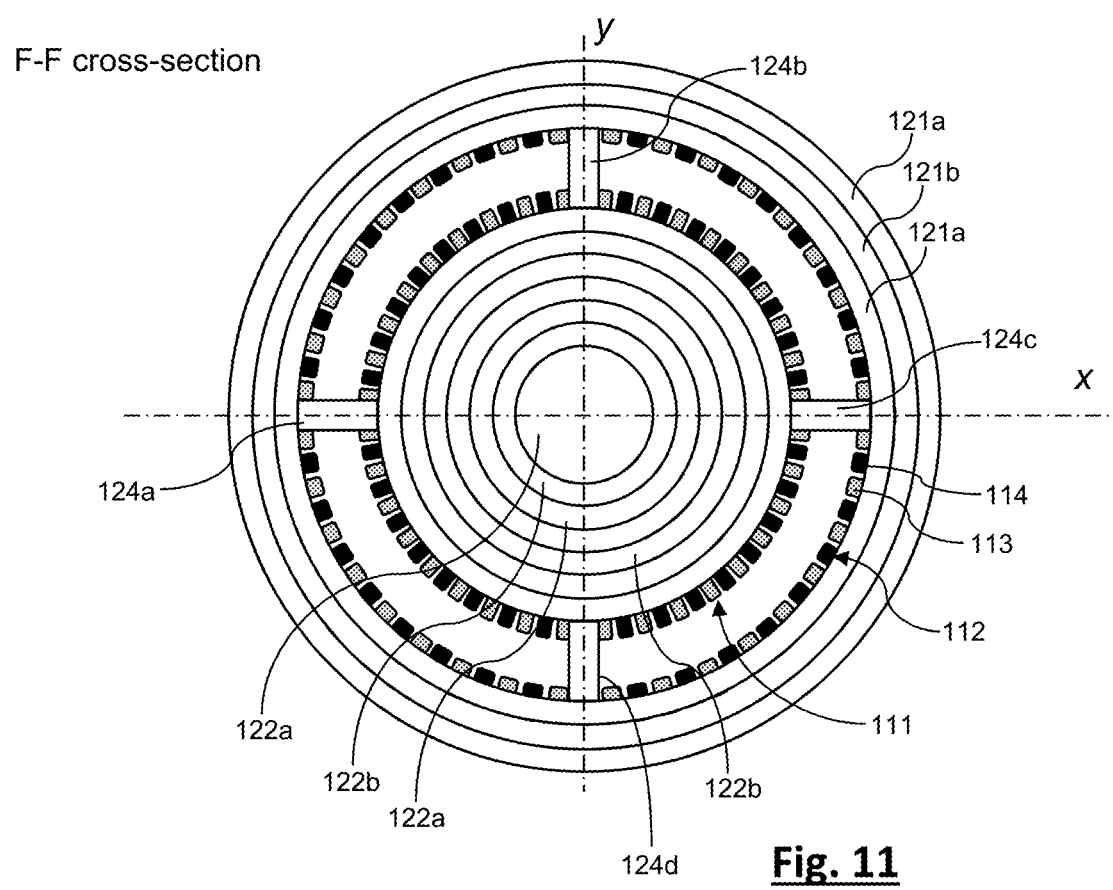
FIG. 11 shows a schematic diagram of a cross section of an ion mobility analyser transverse to the axial direction at a second point along the ion mobility analyser of FIG. 9.

The entrance funnel 120 to the ion mobility analyser 110 may be provided with a plurality of electrodes to guide ions into the annular-shaped ion drift channel. As such, the entrance funnel 120 comprises a plurality of first and second outer annular electrodes 121a, 121b, and a plurality of first and second inner annular electrodes 122a, 122b. A cross-sectional view of the entrance funnel 120 is shown in FIG. 11.

The plurality of outer annular electrodes 121a, 121b are similar to plurality of annular electrodes 21a, 21b, 21c, 21d for the entrance funnel 20 shown in FIG. 2. As such, the plurality of first and second outer annular electrodes 121a, 121b are arranged concentrically about the central axis of the ion drift channel of the ion mobility analyser 10. The plurality of first and second outer annular electrodes 121a, 121b each define an opening having a cross-sectional area. Ions from the source of ions 60 are directed into the openings of the first and second outer annular electrodes 121a, 121b. The cross-sectional area of each opening of the first and second outer annular electrodes 121a, 121b decreases from the source of ions 60 towards the entrance end of the ion mobility analyser. The openings of the first and second outer annular electrodes 121a, 121b may be configured to shape the flow of ions from the source of ions to conform to the shape of the generally circular ion drift channel of the ion mobility analyser 110.

The first and second outer annular electrodes 121a, 121b may be provided with an electrical potential in order to confine ions towards the central axis of the entrance funnel. For example, first and second outer annular electrodes 121a, 121b may be provided with an alternating RF potential in order to provide a confining pseudopotential in a manner similar to a stacked ring ion guide. In some embodiments, the first and second outer annular electrodes 121a, 121b may be provided with the first and second RF potentials (RF1, RF2) in an alternating manner (i.e. first outer annular electrodes 121a, are provided with RF1 and second outer annular electrodes 121b are provided with RF2). The first and second outer annular electrodes 121a, 121b may also be provided with a DC potential in addition to the RF potential. In some embodiments, each outer annular electrode 121a, 121b may be provided with a DC potential $DC_m$ for the $m^{th}$ annular electrode, where there are M outer annular electrodes (m=1, 2, 3 . . . M). In the embodiment of FIG. 9 there are six outer annular electrodes (i.e. M=6). In other embodiments, there may be at least three outer annular electrodes 121, or at least: 5, 7, 9 or 11 outer annular electrodes 121.

In addition to the outer annular electrodes 121a, 121b, the entrance funnel 120 also includes a plurality of first and second inner electrodes 122a, 122b. The first and second inner electrodes 122a, 122b may also be provided as annular or disc-like electrodes arranged concentrically about the central axis of the entrance funnel 120 and the ion mobility analyser 110. The first and second inner electrodes 122a, 122b, are each arranged concentrically within an opening of a corresponding outer annular electrode. The first and second inner electrodes 122a, 122b are configured to guide ions in the entrance funnel, in combination with the first and second outer annular electrodes 121a, 121b, to form an annular shaped (or arc shaped) ion drift channel. As such, the plurality of first and second inner electrodes 122a, 122b increase in diameter from the entrance to the entrance funnel 120 towards the ion mobility analyser 110. The inner electrode closest to the ion mobility analyser (second inner electrode 122f in FIG. 9) may have an outer diameter which is generally similar to the outer diameter of the first electrode assembly 111 at the entrance end of the ion mobility analyser 110.

The first and second inner electrodes 122a, 122b may each be arranged co-planar with a corresponding first or second outer annular electrode 121a, 121b. The first and second inner electrodes 122a, 122b are supplied with an RF potential in a similar manner to the first and second outer annular electrodes. As such, in FIG. 9 first inner electrode 122a is supplied with RF1, while second inner electrode 122b is supplied with RF2 and so on. The first and second inner electrodes 122a, 122b may also be supplied with a DC potential. For example, in FIG. 9 the DC potential applied to each of the first and second outer annular electrodes 121a, 121b may also be supplied to the corresponding first or second inner electrode 122a, 122b.

The exit funnel 130 to the ion mobility analyser 110 shown in FIG. 9 comprises a plurality of third and fourth outer annular electrodes 131a, 131b. The third and fourth outer annular electrodes 131a, 131b are similar in their construction to the first and second outer annular electrodes 121a, 121b. The exit funnel 130 also includes third and further inner electrodes 132a, 132b. The third and further inner electrodes 132a, 132b are similar in their constructions to the first and second inner electrodes 122a, 122b. The exit funnel 130 of FIG. 9 is configured to receive ions from the annular shaped ion drift channel of the ion mobility analyser 110 and to focus the received ions towards an output. In the embodiment of FIG. 9, ions may be focused towards an output opening 134 aligned with a central axis of the ion mobility analyser 110 and the exit funnel 130.

As shown in FIG. 9, the third and fourth outer annular electrodes 131a, 131b are arranged bout the central axis of the exit funnel. The diameter of the opening defined by each of the third and fourth outer annular electrodes 131a, 131b decreases with each outer annular electrode from the ion mobility analyser towards the output opening 134 provided by the last outer annular electrode. Similarly, the third and further inner electrodes 132a, 132b have an outer diameter which decreases with each inner electrode 132 from the ion mobility analyser towards the output opening 134.

Similar to the entrance funnel 120, the third and further outer annular electrodes 132a, 132b and the third and further inner electrodes 132a, 132b may be supplied with alternating RF potentials (RF1 and RF2). The third and further outer annular electrodes 132a, 132b and the third and further inner electrodes 132a, 132b may also be supplied with a DC potential along the axial direction of the exit funnel 130 to guide ions from the ion mobility analyser 110 to the exit opening 134.

While the embodiment of the exit funnel 130 shows an exit opening 134, it will be appreciated that the exit funnel 130 could be implemented in several ways. In addition to a single output design, it would also be possible to provide an exit funnel including a planar slit or several slits, with chosen ions diverted to a particular slit for further processing.

The ion mobility analyser 110 shown in FIG. 9 may be operated in a similar manner to the ion mobility analyser of FIG. 2. For example, the ion mobility analyser 110 and the entrance funnel 120 and the exit funnel 130 may be provided in a vacuum chamber in a similar arrangement to that shown in FIG. 1. Accordingly, the ion mobility analyser 110 may be provided with a source of ions 60 and a source of gas flow 50 for the purpose of performing ion mobility analysis substantially as described above.

While the methods of ion mobility analysis discussed above relate primarily to trapped ion mobility analysis, it will be appreciated that the ion mobility analyser 10, 110 according to this disclosure may be used for other types of ion mobility analysis. For example, the ion mobility analysers according to this disclosure may be used to perform a drift tube ion mobility analysis, a differential ion mobility analysis, or a travelling wave ion mobility analysis. In all cases, extension of the ion drift channel in the direction transverse to the direction in which ions are separated according to their mobility (i.e. the axial direction) increases drastically the space charge capacity. The further provision of a recirculating source of gas flow may provide uniform flow conditions in the ion drift channel across the transverse direction of the ion mobility analyser. As non-TIMS IMS do not require high gas speeds, lower pumping rates and/or larger cross-sections could be employed for such ion mobility analysers, thus further increasing space charge capacity.

The invention claimed is:

1. An ion mobility analyser comprising:
   an ion guide defining an ion drift channel extending in an axial direction, the ion guide comprising:
   first and second electrode assemblies provided on opposing sides of the ion drift channel, each of the first and second electrode assemblies extending in the axial direction and in a transverse direction which is transverse to the axial direction,
   wherein, the first and second electrode assemblies are spaced apart on opposing sides of the ion drift channel by a first distance at a narrowest point along the axial direction,
   each of the first and second electrode assemblies comprising:
   a set of first electrodes; and
   a set of second electrodes, the electrodes in the first and second sets arranged in an alternating pattern in the transverse direction; and
   the alternating pattern extends in the transverse direction a second distance that is greater than the first distance.

2. An ion mobility analyser according to claim 1 wherein in each cross-section of the ion guide normal to the axial direction, the first and second electrode assemblies are uniformly spaced apart along the transverse direction.

3. An ion mobility analyser according to claim 1, wherein the distance the first and second electrode assemblies are spaced apart changes from an entrance end of the ion guide towards an exit end of the ion guide.

4. An ion mobility analyser according to claim 1, wherein the first and second electrode assemblies are spaced apart a uniform distance in the axial direction and in the transverse direction.

5. An ion mobility analyser according to claim 1, further comprising:
an RF power supply configured to supply an RF voltage to the first electrodes and an opposing RF voltage to the second electrodes of each of the first and second electrode assemblies.

6. An ion mobility analyser according to claim 1, further comprising:
a source of gas flow, the source of gas flow configured to direct a laminar gas flow through the ion guide.

7. An ion mobility analyser according to claim 6, wherein a gas flow rate of the source of gas flow is provided such that a boundary layer of the laminar gas flow extending from each of the first and second electrode assemblies is spaced apart from the ion drift channel.

8. An ion mobility analyser according to claim 7, wherein a thickness of the boundary layer extending from each of the first and second electrode assemblies in a direction normal to each of the first and second lines is no greater than 30% of the spacing between the first and second electrode assemblies.

9. An ion mobility analyser according to claim 6, further comprising an ion source,
wherein source of gas flow is provided in addition to any gas flow from the ion source.

10. An ion mobility analyser according to claim 6, wherein the source of gas flow comprises a recirculating pump configured to recirculate gas flow through the ion guide.

11. An ion mobility analyser according to claim 6 wherein, the source of gas flow is configured to direct a laminar gas flow through the ion guide having a Mach number of at least 0.05, or at least 0.1, or at least 0.2, or at least 0.3.

12. An ion mobility analyser according to claim 1, wherein for each of the first and second electrode assemblies, each of the first electrodes are spaced apart from adjacent second electrodes in the transverse direction by a first pitch (H); and
for each of the first and second electrode assemblies, the alternating pattern of first and second electrodes is repeated along the axial direction of the ion guide, each first electrode spaced apart from adjacent second electrodes in the axial direction by a second pitch (h);
wherein the second pitch (h) is smaller than the first pitch (H).

13. An ion mobility analyser according to claim 1, wherein each of the first and second electrode assemblies extend in the transverse direction along straight lines.

14. An ion mobility analyser according to claim 1 wherein the first and second electrode assemblies extend in the transverse direction along concentric circles, or along concentric arcs.

15. An ion mobility analyser according to claim 1, wherein each of the first and second electrodes of the first and second electrode assemblies are configured to also receive a DC bias voltage.

16. An ion mobility analyser according to claim 1, wherein the first and second electrode assemblies are configured to receive a DC bias voltage along the axial direction of the ion guide in order to create potential barrier to trap ions travelling along the ion drift channel.

17. An ion mobility analyser according to claim 1, further comprising
an ion funnel located at an entrance end to the ion guide, the ion funnel at the entrance end configured to funnel ions towards the entrance end of the ion guide and/or an ion funnel located at an exit end to the ion guide, the ion funnel at the exit end configured to funnel ions away from the exit end of the ion guide.

18. A trapped ion mobility spectrometer (TIMS) comprising:
an ion guide defining an ion drift channel extending in an axial direction, the ion guide comprising:
first and second electrode assemblies provided on opposing sides of the ion drift channel, each of the first and second electrode assemblies extending in the axial direction and in a transverse direction which is transverse to the axial direction,
wherein, the first and second electrode assemblies are spaced apart on opposing sides of the ion drift channel by a first distance at a narrowest point along the axial direction,
each of the first and second electrode assemblies comprising:
a set of first electrodes; and
a set of second electrodes, the electrodes in the first and second sets arranged in an alternating pattern in the transverse direction; and
the alternating pattern extends in the transverse direction a second distance that is greater than the first distance;
an RF power supply configured to supply an RF voltage to the first electrodes and an opposing RF voltage to the second electrodes of each of the first and second electrode assemblies;
a source of gas flow, the source of gas flow configured to direct a laminar gas flow through the ion guide; and
a DC voltage source configured to apply a DC potential barrier to at least some of the first and second electrodes of the first and second electrode assemblies in order to trap ions within the ion drift channel.

19. A method of ion mobility analysis comprising:
injecting ions into an ion mobility analyser according to claim 1; and
separating at least some of the ions based on a time of elution from the ion drift channel or a time taken to transit the ion drift channel.

20. An ion mobility analyser-mass spectrometer comprising:
an ion mobility analyser according to claim 1; and
a mass spectrometer configured to receive ions from the ion mobility analyser.

* * * * *